United States Patent Office 3,714,817
Patented Feb. 6, 1973

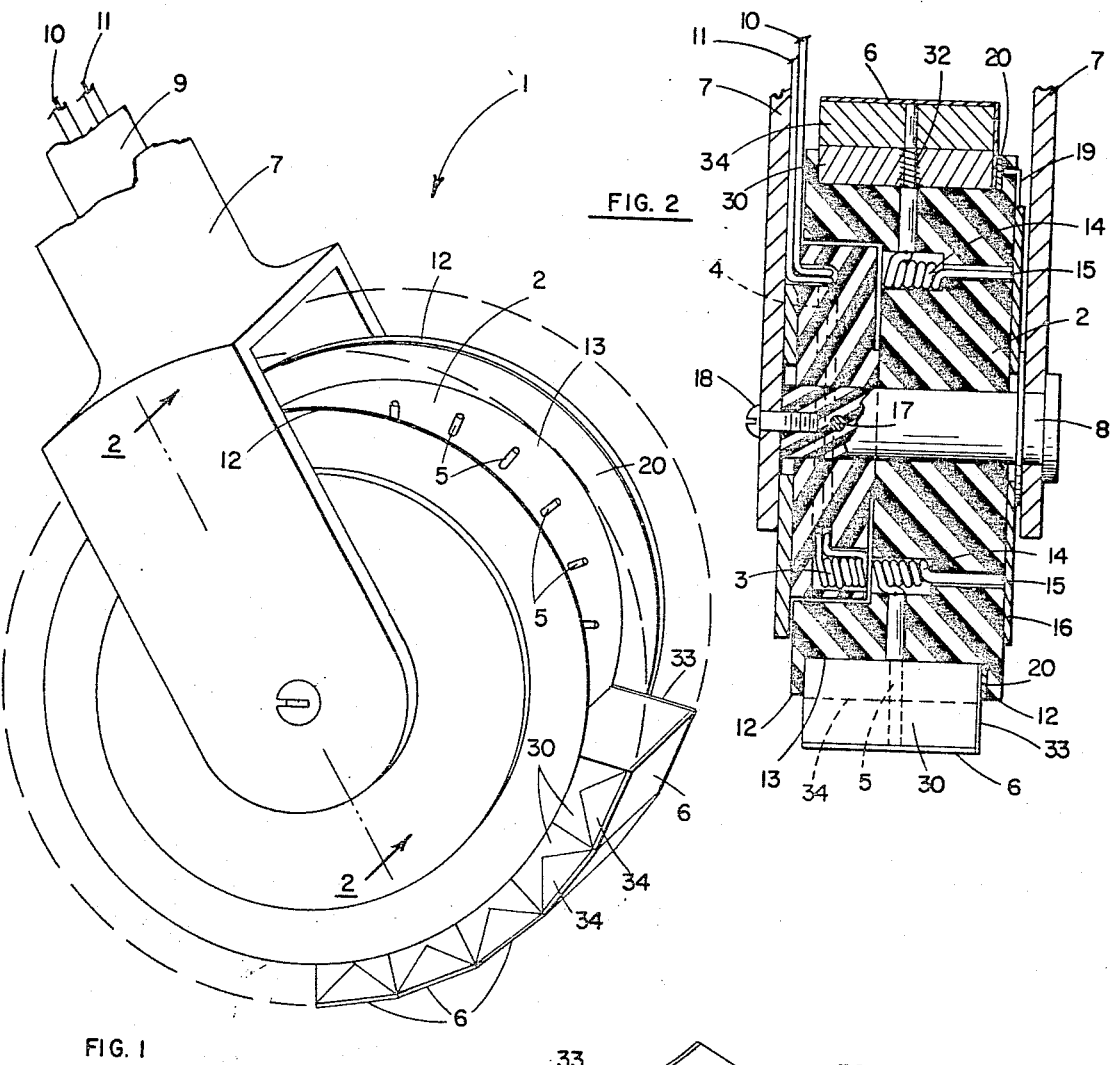
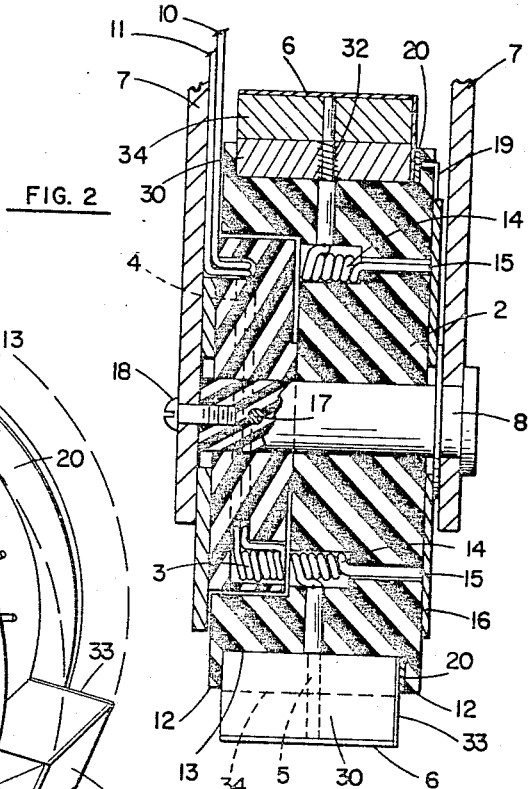
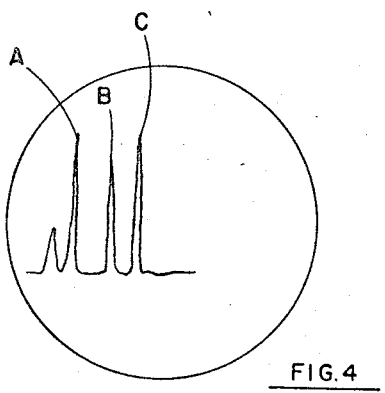
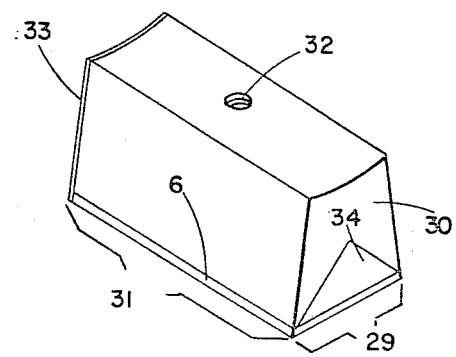
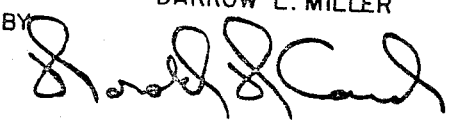
FIG. 1
FIG. 2
FIG. 3
FIG. 4
INVENTOR
DARROW L. MILLER
BY
ATTORNEY

3,714,817
ACOUSTICAL TRANSDUCER WITH ROTARY PULSE COUPLER
Darrow L. Miller, Los Angeles, Calif., assignor to North American Rockwell Corporation
Filed Sept. 28, 1970, Ser. No. 75,997
Int. Cl. G01n 29/00
U.S. Cl. 73—71.5                                    2 Claims

ABSTRACT OF THE DISCLOSURE

A manual probe for ultrasonic inspection of metallic workpieces has a rotatable wheel with a plurality of separate transducer crystals affixed thereon concentric about the rotation axis. The crystals are individually connected to separate secondary transformer coils mounted within the wheel. A stationary primary coil is mounted adjacent the rotatable wheel and adapted to excite each secondary coil in succession as the crystal connected to such coil contacts the workpiece surface during wheel rotation, whereby only one crystal is excited at any given instant.

BACKGROUND OF THE INVENTION

The non-destructive testing of manufactured articles to locate structural defects therein is widely practiced in modern industry. Such testing is of particular importance in high speed aerospace vehicles wherein the use of composite high strength panels is widespread. Such panels often exhibit strength characteristics equivalent to solid structures while being substantially lighter in weight. To maintain the strength-weight ratio of the composite structure, it is necessary to inspect the same to locate any delaminated or unsatisfactory bond areas. It is difficult to inspect composite structures in the field, after the panels have been permanently installed in an aerospace vehicle. Likewise, during the service life of an aircraft the composite panel must be periodically inspected between flights in order to locate any delaminated structures. Since some supersonic aircraft contain as much as 20,000 square feet of bonded panels in their structure, periodic inspection is always a considerable and almost continuous effort.

Heretofore, it has been found most desirable to employ an ultrasonic probe to discover delaminated composite structures in a non-destructive manner. Ultrasonic probes used with conventional electronic equipment produce a pulse of ultrasonic energy which is transmitted within the structure of the workpiece. The acoustical input pulse is usually produced by the application of piezoelectric elements. As is well known, the piezoelectric elements, typically barium titanate, lead zirconate, and lead metaniobate, physically vibrate upon application of a voltage pulse to opposed sides of the piezoelectric element, producing a pulse of ultrasonic energy. The resulting ultrasonic pulse is transmitted to the workpiece and any discontinuities within the workpiece are detected in the displayed signal on the oscilloscope by the attenuation and/or time displacement of the returned ultrasonic pulse. Typically the common commercially available acoustic probes have been flat disc forms, which require the use of a liquid or paste couplant which wets the workpiece and transmits the acoustic signal from the probe. The copending patent application of this inventor, U.S. Ser. No. 7,274, filed Jan. 30, 1970, has a probe for non-destructive ultrasonic testing which provides continuous rolling contact with a workpiece surface. A rotatable element on the probe has a plurality of separate piezoelectric segments secured thereto and each segment adapted to contact the workpiece individually and progressively as the element is rotated. The rotating pulse coupler of the subject invention is particularly suitable for transferring prior generated gated pulses adapted to driving multiple piezoelectric elements as taught in the rotating probe of the earlier copending invention.

SUMMARY OF THE INVENTION

The rotary pulse coupler of this invention transfers electrical gated pulses from an input source to multiple piezoelectric elements disposed on the perimeter of a secondary insulator wheel. The coupler has a single primary stator inductor which receives the gated pulses from a generator and inductively couples the gated pulses to a plurality of secondary inductors radially spaced on the nonmagnetic insulator wheel perimeter. The primary and secondary coils are wound on ferrite cores and are permanently secured in the coupler device. The stator coil, with its ferrite core, is disposed in a nonmagnetic, nonrotating fixed insulator disc and the coil winding is conductively connected to the pulse generator. The multiple secondary coils, each separately wound on a ferrite core, are permanently disposed in the rotating wheel perimeter. The secondary inductors are spaced radially on the wheel perimeter so as to provide electrically conductive connections to piezoelectric elements which can be disposed in the perimeter surface of the insulator wheel. The primary inductor and the multiple secondary inductors are closely adaptively spaced to provide maximum mutual inductance. Each secondary coil can be conductively connected to a piezoelectric element, which can be pulsed as the secondary inductor is pulsed on rotating the secondary insulator wheel past the fixed stator coil.

BRIEF DESCRIPTION OF THE DRAWING

FIG. 1 is a perspective view of the rotary pulse coupler of this invention, illustrated in conjunction with its use in driving piezoelectric elements.

FIG. 2 is a cross sectional view through 2—2 of FIG. 1, illustrating the detailed construction of the coupler, excluding the conventional handle shown in FIG. 1.

FIG. 3 is a perspective view of an elastic "plug-in" cross sectional shaped section containing a flat piezoelectric element 6 of FIG. 1, useful in the application of the coupler.

FIG. 4 is a graphical illustration of the relative input and output pulses generated by piezoelectric element 6 when detecting a defect in a titanium test block.

DETAILED DESCRIPTION OF THE SHOWN EMBODIMENTS

Referring to FIG. 1 this invention contemplates a rotary pulse coupler 1, having a rotatable insulator secondary wheel 2. A fixed stator inductor 3 as illustratively seen from FIG. 2, is disposed inside the fixed stator insulator disc (FIG. 2). Multiple pin connectors 5 are each separately conductively connected to multiple secondary coils which are not shown, and which are disposed in the secondary wheel 2. The pin connectors 5 project normally from the perimeter surface of the secondary wheel 2. The piezoelectric "plug-in" elements 6 are shown disposed inside the insulator wheel rim 12 of the secondary wheel 2, in the perimeter trough 13, each piezoelectric element 6 being attached by an electrical coupling receptacle to a single pin connector 5. The coupler handle 7 is operatively secured by a screw 18 to the fixed stator disc 4, and permits the secondary wheel 2 to rotate. The insulator 9 protects the electrical conductors 10 and 11 which conduct the gated pulses from a pulse generator to the stator inductor 3, as is well known.

Referring to FIG. 2, the cross sectional view illustrates the rotary pulse coupler 1 with the conventional portion of the handle 7 removed. The rotating insulator secondary wheel 2 and the fixed stator disc 4 are shown disposed between the fragmentary sections of the prong handle 7. The fixed single stator inductor 3 is shown disposed in the fixed stator disc 4, with one terminal wire 10 of inductor 3 being shown returning from the primary coil to the pulse generator and the other terminal wire 11 returned to the generator via the grounding lead 11. Two of the multiple secondary inductors 14 are shown disposed in the secondary wheel 2, permanently secured in the wheel 2 on a wheel radius and clearance adapting each secondary inductor to maximum coupling with the primary inductor 3 as they oppositely pass during rotation. Each of the secondary inductors 14 have one secondary coil terminal secured to a pin connector 5. The other secondary rotating coil terminals 15 are electrically connected to the common connecting plate 16, to strap 19 and then to the grounding ring 20 located on the inside of one rotating wheel rim 12. The connection plate 16 is permanently secured to the rotating secondary wheel 2 by screws or the like. The fixed stator disc 4 has another protective plate 16 likewise affixed to it by screws or the like. The axle pin 8 is secured to the fixed stator disc 4 by pin 17 and is pinned in turn to one side of the prong 7 by the screw 18. The perimeter trough 13 circumferentially extends around the secondary wheel 2 providing a securing opening in which a multiplicity of piezoelectric elements 6, each acoustically damped and independently elastically mounted as illustrated in FIG. 3 can be disposed. Each piezoelectric element 6 is separately secured by a conductor spring pin to a mating pin connector 5, as is shown in FIG. 2. Thus each pin connector 5 is adapted to secure one piezoelectric element 6 mounted in its elastic trapezoidal cross sectional shaped module 30 to be adaptively disposed in the trough 13.

As shown in FIG. 3, a typical piezoelectric module contains a piezoelectric element 6 acoustically damped and mechanically strengthened with material 34 with a trapezoidal cross section of width 29 and a length 31, firmly bonded in an elastic module 30, adapting it to snug disposition in the trough 13. A helix wound wire connector 32 electrically connects one conducting face of the piezoelectric element 6 to the pin connector 5, being adapted to mechanically secure to 5. The outside conducting face of piezoelectric element 6 is electrically connected to grounding ring 20 with conductive elastomer 33 painted on one end of the module.

In application of the rotary pulse coupler of this invention to multiple piezoelectric elements, it is preferred to have several secondary inductors disposed on the perimeter of the secondary wheel 2 or the like. The actual number is dependent on the design diameter of the wheel 2 and the number of piezoelectric elements implemented. The inductances of the primary and secondary inductors are preferably designed to mutually couple the two immediate adjacent secondary inductors as the secondary wheel is rotated. Typically, the primary and secondary inductors are wound on ferrite rod type cores having ceramic materials, mainly an oxide ($FeO \cdot Fe_2O_3$) and certain additives of MnO and ZnO sintered at more than 1200° C. By changing the ceramic composition of the ferrite rod and the electrical inductance of the coils one can adapt the optimum frequency response to a range of 1–15 mHz. Typically, for operation at 2.25 mHz the ferrite rod cores are 0.085 inch diameter x 0.322 inch long. The primary coil winding is 35 turns of No. 37 wire and the secondary windings are each 28 turns of No. 37 wire, the wire being insulated with enamel insulation. The secondary turns match the reactance of the piezoelectric elements. The secondary inductances are each about 10 microhenries with a Q of 280.

FIG. 4 is an illustration of an oscilloscope trace indicating the defect in a titanium test block of 92.5 Ti–5 Al–2.5 Sn. Using lead metaniobate piezoelectric elements, the tracing clearly detects a 5/64 inch diameter defect down 1¾ inch depth in the titanium test block. The trace marked A represents the input signal, the trace C represents the reflection from the test block rear surface. The illustrated performance was recorded on a Sperry Reflectoscope Model 700, with gain settings x 0.1, vernier 0.5, in the range of the 1-2.25–5 mHz. bands.

Other ratios of primary and secondary turn windings can be used. The specific construction of the primary and secondary inductances can be formulated to match the individual impedance values of the piezoelectric elements and the pulse generator output impedance as is well known. The primary and secondary inductances can be adhesively bonded in previously machined insulator stator and rotor, or they may be cast in molds with well known insulator compositions, such as epoxy, and polyurethane compositions, and the like. The piezoelectric elements illustratively incorporated in this disclosure have utilized the composite matrix coupler of the copending application filed as of this date by this inventor entitled "Elastomeric Graded Acoustic Impedance Coupling Device."

Obviously many modifications in the rotary pulse coupler can be made in light of these teachings. Other design configurations can be employed equally well. While a rod type configuration is delineated in this disclosure, wheel designs using cup cores, flat pancake type or other magnetic coupling configurations may be used with similar results. It is therefore understood that within the scope of the appended claims, the invention may be practiced otherwise than as specifically described.

I claim:

1. An ultrasonic probe in combination with a rotary pulse coupler for direct contact with a workpiece surface, said combination comprising:

a handle means;

a stator disc fixedly secured to said handle means;

an insulator wheel rotatably mounted to said handle means adjacent to said fixed stator disc, said insulator wheel includes a trough circumferentially disposed therein;

a stator inductor fixedly disposed in said fixed stator disc;

a multiplicity of secondary inductor coils radially disposed within said rotatable insulator wheel for individual alignment with said stator inductor to provide a pulse coupling relationship as said wheel is rotated, and wherein each of said secondary coils is axially aligned with said stator inductor in a sequential manner as said insulator wheel rotates causing a pulsating flow of energy to pass therebetween, said secondary coils being concentrically mounted about the axis of rotation of said insulator wheel, and wherein said stator inductor and said secondary coils are positioned equidistance from said axis;

a plurality of individual piezoelectric elements adapted to be circumferentially mounted to said wheel in a juxtaposed relationship to each other for sequential contact with said workpiece surface, and wherein each of said piezoelectric elements being removably disposed within said trough and operably connected to each of said secondary inductor coil; and a plurality of connector pins radially extending from said trough, one end of each pin being secured to said corresponding secondary inductor coil, the opposite end of said pin being removably received in said corresponding piezoelectric element.

2. An ultrasonic probe in combination with a rotary pulse coupler for direct contact with a workpiece surface, said combination comprising:

a handle means;

a stator disc fixedly secured to said handle means;

an insulator wheel rotatably mounted to said handle means adjacent to said fixed stator disc;

a multiplicity of secondary inductor coils concentrically mounted about the axis of rotation of said insulator wheel, and radially disposed within said rotatable insulator wheel for individual alignment with said stator inductor to provide a pulse coupling relationship as said wheel is rotated, and wherein said stator inductor and said secondary coils are positioned equidistant from said axis;

wherein each of said secondary coils is axially aligned with said stator inductor in a sequential manner as said insulator wheel rotates causing a pulsating flow of energy to pass therebetween;

a plurality of individual piezoelectric elements adapted to be circumferentially mounted to said wheel in a juxtaposed relationship to each other for sequential contact with said workpiece surface, and operably connected to corresponding secondary inductor coils; and wherein said insulator wheel includes a trough circumferentially disposed therein and wherein each of said piezoelectric elements is removably disposed within said trough and operably connected to a secondary inductor coil.

References Cited

UNITED STATES PATENTS

| 3,541,840 | 11/1970 | Phelan | 73—71.5 U |
| 3,423,991 | 1/1969 | Collins | 73—71.5 U |
| 3,121,326 | 2/1964 | Klatchko | 73—67.8 S |
| 3,423,993 | 1/1969 | Lynnworth | 73—71.5 U |

JAMES J. GILL, Primary Examiner